(12) United States Patent
Diao et al.

(10) Patent No.: US 12,031,013 B2
(45) Date of Patent: Jul. 9, 2024

(54) SILANE COUPLING AGENTS TO IMPROVE RESIN ADHESION (71) Applicant: MOMENTIVE PERFORMANCE MATERIALS INC., Waterford, NY (US)

(72) Inventors: Cheng Diao, White Plains, NY (US); Monjit Phukan, West Harrison, NY (US); Neal Patel, Nyack, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 99 days.

(21) Appl. No.: 17/865,880

(22) Filed: Jul. 15, 2022

(65) Prior Publication Data
US 2023/0043080 A1    Feb. 9, 2023

Related U.S. Application Data (60) Provisional application No. 63/223,186, filed on Jul. 19, 2021.

(51) Int. Cl.
C08K 5/544    (2006.01)
C08G 73/10    (2006.01)
(Continued)

(52) U.S. Cl.
CPC .............. C08K 5/544 (2013.01); C08G 73/10 (2013.01); C09D 7/63 (2018.01); C09D 133/24 (2013.01)

(58) Field of Classification Search
CPC ..................................................... C08K 5/544
See application file for complete search history.

(56) References Cited

U.S. PATENT DOCUMENTS 10,871,802 B2    12/2020 Yug
2015/0166731 A1   6/2015 Sattich
(Continued)

FOREIGN PATENT DOCUMENTS

CN    102329336 A  *  1/2012  .............. C07F 7/081
EP    0283994 A2      9/1988
(Continued)

OTHER PUBLICATIONS

International Search Report and Written Opinion from PCT/US2022/037430 mailed Oct. 11, 2022.

Primary Examiner — Vickey Nerangis
(74) Attorney, Agent, or Firm — James C. Abruzzo (57) ABSTRACT There is provided herein a resin composition comprising:
(i) a silane coupling agent of the general formula (I):

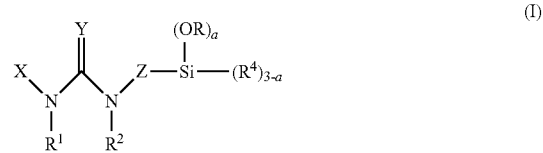

as described herein, and (ii) at least one resin which is interactive with one or more of the $R^1$, $R^2$ and X groups of silane coupling agent (i)

wherein:

$R^1$ and $R^2$ each represent a hydrogen atom or a monovalent organic group having 1 to 40 carbon atoms;

$R^3$ is independently a monovalent group selected from the group consisting of a straight chain alkyl containing from 1 to 12 carbon atoms, a branched chain alkyl containing from 3 to 12 carbon atoms, a cycloalkyl containing from 5 or 6 carbon atoms, an alkenyl containing from 2 to 12 carbon atoms, an aryl group containing 6 carbon atoms, or aralkyl containing from 7 to 12 carbon atoms, a straight chain alkyl containing 2 to 12 carbon atoms and a hydroxyl group, a branched chain alkyl containing 3 to 6 carbon atoms and a hydroxyl group, an alkyl group containing at least one oxygen atom having the structure:

$$-R^5-(OCH_2CH_2)_m(OCH_2CH(CH_3))_nOR^6,$$

and a divalent group formed from two $R^3$ groups being bonded together through a covalent bond, with the provisos that (i) if two $R^3$ groups are bonded together, then a is 2 or 3 and (ii) the sum of m+n is from 1 to 20;

each $R^4$ is independently a monovalent group selected from the group consisting of a straight chain alkyl containing from 1 to 12 carbon atoms, a branched chain alkyl containing from 3 to 12 carbon atoms, a cycloalkyl containing from 5 or 6 carbon atoms, an alkenyl group containing from 2 to 12 carbon atoms, an aryl group containing 6 carbon atoms or aralkyl group containing from 7 to 12 carbon atoms;

$R^5$ is divalent group selected from the group consisting of a straight chain alkylene containing from 1 to 10 carbon atoms, a branched chain alkylene containing from 3 to 10 carbon atoms, and a cycloalkylene containing from 5 to 10 carbon atoms;

$R_6$ is a monovalent group selected from the group consisting of a straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, an aralkyl containing from 7 to 18 carbon atoms and hydrogen, or $R^6$ is a divalent group selected from the group consisting of an alkyl containing from 1 to 10 carbon atoms, a cycloalkyl containing from 5 to 10 carbon atoms and phenyl.

17 Claims, 1 Drawing Sheet (51) Int. Cl.
*C09D 7/63* (2018.01)
*C09D 133/24* (2006.01)

(56) References Cited

U.S. PATENT DOCUMENTS

| | | |
|---|---|---|
| 2018/0256476 A1 | 9/2018 | Dublanchet et al. |
| 2019/0055428 A1 | 2/2019 | Ashibe |
| 2021/0020460 A1 | 1/2021 | Kuroda |
| 2021/0079215 A1 | 3/2021 | Arisawa |
| 2023/0178385 A1* | 6/2023 | Kuroda ................ H01L 21/566 438/106 |

FOREIGN PATENT DOCUMENTS

| | | |
|---|---|---|
| EP | 3117993 B1 | 1/2019 |
| EP | 3686232 A1 | 7/2020 |
| JP | S59197421 A | 11/1984 |
| JP | 2010-163633 A | 7/2010 |
| JP | 2010241724 A | 10/2010 |
| JP | 5343570 B2 | 11/2013 |
| JP | 2019-52246 A | 4/2019 |
| JP | 6766788 B2 | 10/2020 |
| WO | 2004/093834 A1 | 4/2004 |
| WO | 2009/099918 A1 | 8/2009 |

* cited by examiner

Figure 1: Scratching testing on polyimide film coated on copper substrate

Figure 2: Scratching testing on polyimide film coated on stainless steel substrate Figure 3: Scratching testing on polyimide film coated on glass substrate

SILANE COUPLING AGENTS TO IMPROVE RESIN ADHESION

FIELD OF THE INVENTION

The present invention relates to a resin composition comprising a silane coupling agent and a resin. The resin composition, can be used in various electronic components and applications.

DESCRIPTION OF THE RELATED ART

In applications using resins together with other materials, interfacial bonding is critical in determining a product's quality, performance, and long-term reliability. Organic polymers/resins normally have weak interfacial bonding with inorganic materials such as metal, glass and ceramic due to their different chemical natures.

Traditionally, silane coupling agents have been used to increase the interfacial adhesion between the organic resin and an inorganic substrate. The silyl portion of the silane coupling agent bonds with hydroxyl groups on the inorganic substrate and the organic functional group of the silane coupling agent bonds with the organic resin.

Nevertheless, in many applications, existing silane coupling agents do not provide sufficient interfacial bonding which is sufficient for various industrial requirements. For example, in flexible copper clad laminate applications weak adhesion between an organic material and copper can cause delamination during processing and application. In flexible displays weak adhesion between an organic film and a glass substrate can cause the organic film to delaminate from the glass substrate, disrupting the manufacturing process. In flexible electronic devices, such as foldable or rollable smartphones, an organic polymer film can be used as a flexible screen cover, with coatings applied on top. Weak adhesion can cause those coatings to delaminate from the organic polymer film prematurely, affecting coating durability. In a foldable electronic device structure, the area where the display is folded is split into portions which are implemented to move about each other, rendering it difficult for the display to rest in a fixed position in the electronic device. Where the electronic device repeats between the flat position and folded position, the foldable area of the display may deform, failing to maintain the flat surface.

Thus, there is a need for silane coupling agents which increase the adhesion in the noted applications.

SUMMARY OF THE INVENTION

The inventors herein have surprisingly discovered a silane coupling agent which improves interfacial adhesion between various substrates and numerous resin materials through hydrogen bonding. While not wishing to be bound by theory, it is believed that the silane coupling agent of the present invention not only provides for hydrogen bonding between the substrate moieties and the silyl moiety, but in addition, the ureido and aromatic/heterocyclic ring moieties of the silane coupling agent described herein, form "coordinated" hydrogen bonds to many different resins. The silane coupling agent described herein improves interfacial adhesion between resins and substrates used in various electronic applications.

There is provided herein a resin composition comprising:
(i) a silane coupling agent of the general formula (I):

where X represents an aromatic group containing up to 14 carbon atoms, or a heterocyclic group containing up to 14 heteroatoms, and wherein the aromatic group or the heterocyclic group is optionally substituted with one or more alkyl groups each containing from 1 to 4 carbon atoms, and/or at least one heteroatom, e.g., O, N, S;

Y is oxygen or sulfur;

Z is a divalent straight chain alkylene group containing from 1 to 20 carbon atoms, or a divalent branched chain alkylene group containing from 3 to 20 carbon atoms, each optionally containing a heteroatom;

the subscript a is 1, 2 or 3;

$R^1$ and $R^2$ each represent a hydrogen atom or a monovalent organic group having 1 to 40 carbon atoms;

$R^3$ is independently a monovalent group selected from the group consisting of a straight chain alkyl containing from 1 to 12 carbon atoms, a branched chain alkyl containing from 3 to 12 carbon atoms, a cycloalkyl containing from 5 or 6 carbon atoms, an alkenyl containing from 2 to 12 carbon atoms, an aryl group containing 6 carbon atoms, or aralkyl containing from 7 to 12 carbon atoms, a straight chain alkyl containing 2 to 12 carbon atoms and a hydroxyl group, a branched chain alkyl containing 3 to 6 carbon atoms and a hydroxyl group, an alkyl group containing at least one oxygen atom having the structure:

$$-R^5-(OCH_2CH_2)_m(OCH_2CH(CH_3))_nOR^6,$$

and a divalent group formed from two $R^3$ groups being bonded together through a covalent bond, with the provisos that (i) if two $R^3$ groups are bonded together, then a is 2 or 3 and (ii) the sum of m+n is from 1 to 20;

each $R^4$ is independently a monovalent group selected from the group consisting of a straight chain alkyl containing from 1 to 12 carbon atoms, a branched chain alkyl containing from 3 to 12 carbon atoms, a cycloalkyl containing from 5 or 6 carbon atoms, an alkenyl group containing from 2 to 12 carbon atoms, an aryl group containing 6 carbon atoms or aralkyl group containing from 7 to 12 carbon atoms;

$R^5$ is divalent group selected from the group consisting of a straight chain alkylene containing from 1 to 10 carbon atoms, a branched chain alkylene containing from 3 to 10 carbon atoms, and a cycloalkylene containing from 5 to 10 carbon atoms;

$R^6$ is a monovalent group selected from the group consisting of a straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, an aralkyl containing from 7 to 18 carbon atoms and hydrogen, or $R^6$ is a divalent group selected from the group consisting of an alkyl containing from 1 to 10 carbon atoms, a cycloalkyl containing from 5 to 10 carbon atoms and phenyl; and, (ii) at least one resin which is interactive with one or more of the $R^1$, $R^2$, Y and X groups of silane coupling agent (i) and which is present in an amount of from about 10 weight percent to about 99.99 weight percent of the resin composition.

BRIEF DESCRIPTION OF THE DRAWINGS

Reference is had to the following description, taken in connection with the accompanying drawings, in which.

DETAILED DESCRIPTION OF THE INVENTION

In the specification and claims herein, the following terms and expressions are to be understood as indicated.

The singular forms "a," "an," and "the" include the plural, and reference to a particular numerical value includes at least that particular value, unless the context clearly dictates otherwise.

The use of any and all examples, or exemplary language (e.g., "such as") provided herein, is intended merely to better illustrate the invention and does not pose a limitation on the scope of the invention unless otherwise claimed.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

No language in the specification should be construed as indicating any non-claimed element as essential to the practice of the invention.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

In one embodiment herein, it will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species, or detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The expression "silane coupling agent" as used herein is understood to be a material which is capable of being interactive and/or reactive with both the hydroxy groups on an inorganic substrate and the reactive moieties of a resin, e.g., reactive with the organic group(s) of an organic resin. While not wishing to be bound by theory, the —OR$^3$ moieties of formula (I) of the organosilane coupling agent described herein are each a moiety that produces a silanol group by reacting with water, and this silanol group is dehydrated and condensed with an inorganic material, e.g., an inorganic substrate such as metal or glass, to form a chemical bond of the formula: ≡Si—OM (M: inorganic material).

The expression "resin" as used herein can comprise not only a cured polymer material, but can include polymer precursor materials, e.g., polyimide precursor. The resins herein include both organic and inorganic resins.

The expression "heterocyclic group" as used herein is understood to be a ring of atoms of at least two elements, one of which is carbon, and the other of which is a heteroatom, e.g., N, O, and S.

The expression "which is interactive with" as used herein refers to the ability of the organic moieties of the silane coupling agent described herein to chemically react with the resin described herein.

The term "electronic device" may mean a device performing a particular function according to its equipped program, such as a portable phone, e.g., a "smartphone", a home appliance, an electronic scheduler, a portable multimedia player, a mobile communication terminal, a tablet PC, a video/sound device, a desktop PC or laptop computer, a navigation for automobile, etc.

Silane Coupling Agent (i)

In an embodiment herein the silane coupling agent of the general formula (I) described above, is such that X represents an aromatic group containing 6 carbon atoms, e.g., phenyl, or a heterocyclic group containing up to 5 heteroatoms, preferably 3 heteroatoms, more preferably 1 or 2 heteroatoms, e.g., each being N, and wherein the heterocyclic group is optionally substituted with one or more alkyl groups each containing from 1 to 4 carbon atoms, preferably methyl, or alternatively methyl as one substituent and a carbonyl oxygen as another substituent;

where Y is preferably oxygen; Z is preferably a divalent straight chain alkylene group containing from 1 to 12 carbon atoms, more preferably from 1 to 8 carbon atoms, and most preferably from 1 to 4 carbon atoms, or 3 carbon atoms, e.g. (—$CH_2$—)$_3$;

the subscript a is preferably 2 or 3, most preferably 3;

$R^1$ and $R^2$ each preferably represent a hydrogen atom, or alternatively a monovalent organic group having 1 to 20 carbon atoms, more preferably from 1 to 8 carbon atoms, most preferably from 1 to 4 carbon atoms, such as the non-limiting examples of methyl, ethyl, propyl, isopropyl, butyl, isobutyl and the like;

$R^3$ is preferably independently a monovalent group selected from the group consisting of a straight chain alkyl containing from 1 to 8 carbon atoms, more preferably 1 to 4 carbon atoms or a branched chain alkyl containing from 3 to 8 carbon atoms, more preferably 3 to 4 carbon atoms, such as the non-limiting examples of methyl, ethyl, propyl, isopropyl, butyl, isobutyl and the like, a cycloalkyl containing 6 carbon atoms, an alkenyl containing from 2 to 8 carbon atoms, preferably from 2 to 4 carbon atoms, an aryl group, e.g., phenyl, or aralkyl containing from 7 to 10 carbon atoms, preferably from 7 to 9 carbon atoms, a straight chain alkyl containing 2 to 8 carbon atoms and a hydroxyl group, preferably from 2 to 4 carbon atoms and a hydroxyl group, a branched chain alkyl containing 3 or 4 carbon atoms and a hydroxyl group, an alkyl group containing at least one oxygen atom having the structure:

—$R^5$—(OCH$_2$CH$_2$)$_m$(OCH$_2$CH(CH$_3$))$_n$OR$^6$, wherein the sum of m+n is from 1 to 12, preferably from 1 to 8, more preferably from 1 to 4;

each $R^4$ is independently a monovalent group selected from the group consisting of a straight chain alkyl containing from 1 to 8 carbon atoms, preferably from 1 to 4 carbon atoms, a branched chain alkyl containing from 3 to 8 carbon atoms, preferably from 3 to 4 carbon atoms, a cycloalkyl containing 6 carbon atoms, an alkenyl group containing from 2 to 8 carbon atoms, more preferably from 2 to 6 carbon atoms, an aryl group such as phenyl, or aralkyl group containing from 7 to 10 carbon atoms, preferably from 7 to 9 carbon atoms;

$R^5$ is divalent group selected from the group consisting of a straight chain alkylene containing from 1 to 10 carbon atoms, a branched chain alkylene containing from 3 to 10 carbon atoms, and a cycloalkyl containing from 5 to 10 carbon atoms;

$R^6$ is preferably a monovalent group selected from the group consisting of a straight chain alkyl containing from 1 to 12 carbon atoms, more preferably from 1 to 8 carbon atoms, most preferably from 1 to 4 carbon atoms, a branched chain alkyl containing from 3 to 12 carbon atoms, more preferably from 3 to 8 carbon atoms, and most preferably from 3 to 6 carbon atoms, a cycloalkyl containing from 6 to 12 carbon atoms, more preferably from 6 to 8 carbon atoms, an alkenyl containing from 2 to 12 carbon atoms, more preferably from 2 to 8 carbon atoms, an aryl group containing from 6 to 12 carbon atoms, more preferably from 6 to 8 carbon atoms, an aralkyl containing from 7 to 12 carbon atoms, more preferably from 7 to 9 carbon atoms, and hydrogen, or $R^6$ is a divalent group selected from the group consisting of an alkyl containing from 1 to 8 carbon atoms, more preferably from 1 to 4 carbon atoms, a cycloalkyl containing from 6 to 8 carbon atoms, and phenyl.

In an embodiment of formula (I), $R^1$ and $R^2$ are each H, Y is O, Z is a divalent straight chain alkylene group containing from 2 to 6 carbon atoms, the subscript a is 3, and each $R^3$ is a straight chain alkyl group containing from 1 to 3 carbon atoms.

In another embodiment of formula (I), X is a phenyl group, and wherein $R^1$ and $R^2$ are each H, Y is O, Z is a divalent straight chain alkylene group containing from 2 to 6 carbon atoms, the subscript a is 3, and each $R^3$ is a straight chain alkyl group containing from 1 to 3 carbon atoms.

In another embodiment of formula (I), X is a heterocyclic group containing 1 or 2 N atoms, and wherein $R^1$ and $R^2$ are each H, Y is O, Z is a divalent straight chain alkylene group containing from 2 to 6 carbon atoms, the subscript a is 3, and each $R^3$ is a straight chain alkyl group containing from 1 to 3 carbon atoms.

In yet another embodiment of formula (I), X is a heterocyclic group containing 2 N atoms, and which is substituted with O heteroatom, and wherein $R^1$ and $R^2$ are each H, Y is O, Z is a divalent straight chain alkylene group containing from 2 to 6 carbon atoms, the subscript a is 3, and each $R^3$ is a straight chain alkyl group containing from 1 to 3 carbon atoms.

In yet another further embodiment of formula (I), X is a heterocyclic group containing 2 N atoms and which is substituted with O heteroatom in the form of a carbonyl O, and an alkyl group containing 1 or 2 carbon atoms, and wherein $R^1$ and $R^2$ are each H, Y is O, Z is a divalent straight chain alkylene group containing from 2 to 6 carbon atoms, the subscript a is 3, and each $R^3$ is a straight chain alkyl group containing from 1 to 3 carbon atoms.

In an embodiment, the silane coupling agent (i) of general formula (I) as described herein can have any of the six structures (#1-#6) shown herein below:

In an embodiment herein, the silane coupling agent (i) can be present in the resin composition in varying amounts based upon the choice of resin (ii), and/or based upon the application of the resin composition, and will be determined by one of ordinary skill in the art. However, in an embodiment, the amount of silane coupling agent (i) can be from about 0.01 to about 40 parts by mass, and more preferably from about 0.5 to about 10 parts by mass relative to 100 parts by mass of the resin (ii). In one embodiment herein, the resin composition can include one or more of the silane coupling agent(s) (i) described herein, i.e., a mixture of two or more different silane coupling agents (i).

Resin (ii)

The resin (ii) as described herein can be any organic or inorganic polymer or polymer precursor which contains moieties capable of chemical reaction with the silane coupling agent (i) described herein.

In an embodiment herein the resin (ii) is selected from the group consisting of polyimide, polyetherimide, polyurethane, silylated polyurethane, polyether, silylated polyether, polyphenylene ether, bismaleimide, polyisocyanurate, polyethylene terephthalate, glycol-modified polyethylene terephthalate, polybutylene terephthalate, low density polyethylene, very low density polyethylene, linear low density polyethylene, high density polyethylene, polypropylene, polyisobutylene, polyvinyl acetate, polyvinyl alcohol, polystyrene, polycarbonate, polyethylene naphthalate, polyvinylchloride, polyvinylidene chloride, polyvinylidene fluoride, acrylonitrile butadiene styrene, polymethylmethacrylate, polyvinyl fluoride, polyamides, polymethylpentene, polyether ether ketone, polysulfone, polyether sulfone, ethylene chlorotrifluoroethylene, polytetrafluoroethylene, cellulose acetate, cellulose acetate butyrate, plasticized polyvinyl chloride, polyphenylene sulfide, styrene-maleic anhydride, modified polyphenylene oxide, ethylene-propylene rubber, polybutadiene, polychloroprene, polyisoprene, styrene-butadiene-styrene, styrene-ethylene-butadiene-styrene, silicones, e.g., polymethylphenyl siloxane, silylated resins, e.g., silylated polyurethane resin, and mixtures thereof.

Preferably, the resin (ii) is selected from the group consisting of polyimide, polyetherimide, polyurethane, polyphenylene ether, bismaleimide, polyethylene terephthalate, polyethylene, polypropylene, polyisobutylene and combinations thereof, and most preferably is polyimide, e.g., conventional polyimide, or colorless polyimide.

The amount of the resin (ii) that is employed in the resin composition will depend on the specific polymer and intended application of the resin composition and can be determined by a person of ordinary skill in the art. However, in one non-limiting embodiment, the amount of resin (ii) can be from about 10 weight percent to about 99.99 weight percent, or in another embodiment from about 15 weight percent to about 99.99 weight percent, preferably from about 50 weight percent to 99 weight percent, more preferably from about 80 weight percent to about 99 weight percent, and most preferably from about 90 weight percent to about 99 weight percent, said weight percent being based on the total weight of the resin composition.

In another non-limiting embodiment, the resin (ii) is a polyimide, and the resin composition herein is made by mixing a polyimide precursor solution, which is made by reacting diamine monomers with dianhydride monomers in NMP solvent until high viscosity is reached, with the silane coupling agent, stirring for several hours (normally 2 to 12 hours). However, this process is not limited to polyimide as the resin (ii), and the process can be modified accordingly to accommodate any of the resins (ii) described herein as will be understood by those skilled in the art. In one embodiment, the resin composition described herein can be made by contacting, e.g., mixing, the silane coupling agent (i) and resin (ii) as described herein.

Auxiliary Additives

The resin composition of the present invention may contain any other additive in addition to the above-mentioned composition components of silane coupling agent (i) and resin (ii), provided they are used within a range of amounts which do not detract from the advantageous effects of the present invention, and such ranges of amounts will be appreciated by those skilled in the art. For example, the composition may contain any one or more of an antioxidant, a light stabilizer, a surfactant, a flame retardant, a plasticizer, a UV absorbent, any other polymer compound than the above-mentioned organic resin (ii), a curing agent, curing accelerator, an inorganic filler, a solvent, an antioxidant, a pigment, a dye and the like.

One non-limiting example of a curing agent is a phenolic curing agent. Suitable phenolic curing agents are known by those skilled in the art. As a structure of the curing agent, a polyalcohol having 2 to 10 OH groups is preferred.

As a curing accelerator some non-limiting examples include, imidazoles such as imidazole, 2-methylimidazole, 2-ethylimidazole, 2-heptadecylimidazole, 1,2-dimethylimidazole, 2-ethyl-4-methylimidazole, 2-undecylimidazole, 2-phenylimidazole, 2-phenyl-4-methylimidazole, 1-benzil-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4,5-dihydroxymethylimidazole, and 2-phenyl-4-methyl-5-hydroxymethylimidazole; tertiary amines such as 2-ethyl-4-methylimidazole 2-(dimethylaminomethyl)phenol, triethylene diamine, triethanolamine, 1,8-diazabicyclo[5.4.0]undecene-7, and tris(dimethylaminomethyl)phenol; organic phosphines such as diphenylphosphine, triphenylphosphine and tributylphosphine; tetra-substituted phosphonium/tetra-substituted borate such as tetraphenylphosphonium/tetraphenyl borate and tetraphenylphosphonium/ethyltriphenyl borate; and metal compounds such as tin oxalate. The amount of curing agent can be in an amount of from about 0.01 to about 20.0 parts by mass, more preferably from about 0.1 to about 5.0 parts by mass relative to 100 parts by mass of the resin (ii).

The resin composition can also contain an inorganic filler. Examples of the inorganic filler include: oxides such as titanium oxide, alumina, fused silica (fused spherical silica, fused crushed silica), and powder of crystalline silica; silicates such as talc, glass, calcined clay; nitrides such as aluminum nitride, boron nitride, and silicon nitride; carbonates such as calcium carbonate and magnesium carbonate; hydroxides such as aluminum hydroxide, magnesium hydroxide and calcium hydroxide; sulfates or sulfites such as barium sulfate, calcium sulfate, and calcium sulfite. These inorganic fillers may be used singularly or in a combination of two or more kinds. An average particle size of the inorganic filler is not particularly limited, but is preferably from about 0.01 to about 30 μm, and more preferably from about 0.03 to about 14 μm as determined by transmission electron microscopy (TEM).

Among these, silica powder such as the fused silica and crystalline silica are preferable. A content of the inorganic filler is preferably from about 14 to about 96 mass %, more preferably from about 20 to about 96 mass %, still more preferably from about 50 to about 95 mass %, and particularly preferably from about 60 to about 93 mass % in the solid content of the resin composition. The solid content is defined as a component other than an organic solvent.

The resin composition of the present invention may contain a solvent, preferably an organic solvent. Examples of the organic solvents include: N,N-dimethylacetamide, dimethyl sulfoxide, methyl ethyl ketone, N,N-dimethylformamide, cresol, cyclohexanone, cyclopentanone, N-methyl-2-pyrrolidone, methanol, ethanol, isopropanol, acetone, propylene glycol monomethyl ether, propylene glycol monomethyl ether acetate, toluene, and xylene, in particular, methyl ethyl ketone, cyclopentanone, propylene glycol monomethyl ether, and propylene glycol monomethyl ether acetate are preferred, but are not limited to these. These organic solvents may be used singularly or in a combination of two or more kinds. A suitable amount of organic solvent, based on solid content concentration in the resin composition is preferably from about 40 to about 90 mass %.

The resin composition of the present invention may contain a flame retardant agent to improve the flame retardancy. As the flame retardant agent, a phosphorus-based flame retardant agent may be employed. Examples of these include a phosphazene compound, a phosphate ester compound and a phosphate ester amide compound. A content of the flame retardant agent is preferably 3 to 40 parts by mass relative to 100 parts by mass of the resin (ii).

Other than the above, various kinds of additives may be appropriately added to improve various characteristics such as the storage stability of the resin composition or the workability. For example, an internal mold release agent such as a fatty acid ester, glyceric acid ester, zinc stearate, and calcium stearate, and a phenol-based, a phosphorus-based or a sulfur-based antioxidant may be added. Furthermore, the composition may be colored with a pigment such as the non-limiting example of carbon black.

In an embodiment of the present invention, no filler or additive other than the silane coupling agent (i) is incorporated into the resin (ii) whereby a laminate with high transparency can be produced.

The resin composition can be employed to make an article therefrom, e.g., wherein the article is selected from the group consisting of a resin film, a resin film with copper foil, a laminate, e.g., a flexible copper clad laminate, a prepreg, a printed circuit board, and a flexible electronic device. In an embodiment, the laminate comprises a substrate selected from the group consisting of plastic film, silicon wafer, ceramic, organic material, metal e.g., copper foil, and glass. In an embodiment, the laminate is a flexible copper clad laminate. The flexible electronic device can be a flexible display, which can be in part or in whole used to make up a foldable or rollable smartphone.

In another embodiment there is provided a resin film made into a film form from the resin composition of the present invention. The resin film of the present invention is obtained by processing the resin composition into a film as is known by those skilled in the art.

The resin film of the present invention may be one in which a protective film is laminated on the resin film obtained from the resin composition. In one non-limiting example of a method for producing the resin film of the present invention, the silane coupling (i) and the resin (ii), and other components are mixed to prepare a resin composition solution, the resin composition solution is applied on a protective film so as to be a desired thickness with a reverse roll coater or a comma coater. The protective film applied with the resin composition solution is passed through an inline dryer to remove an organic solvent at from about 80 to about 160° C. for about 2 to about 20 minutes to dry, followed by compressing and laminating with a separate protective film using a roll laminator to be able to obtain a laminate film in which a resin film is formed.

When the resin composition of the present invention is formed into a film shape, there is no restriction on the thickness but the thickness is preferably about 2 mm or smaller, more preferably about 50 μm or thicker and about 1,200 μm or thinner, and further preferably about 80 to about 850 μm.

The protective film is not particularly restricted as long as it can be peeled without damaging a shape of the resin film made of the resin composition, but functions as a protective film and a peel film for a wafer, and usually plastic films such as a polyethylene (PE) film, a polypropylene (PP) film, a polymethylpentene (TPX) film, and a polyester film provided with a mold release treatment are used. Furthermore, the peeling force is preferably from about 50 to about 300 mN/min. A thickness of the protective film is preferably from about 25 to about 150 μm, and more preferably from about 38 to about 125 μm.

A laminate of the present invention has a cured product of the resin film of the present invention on a substrate. In an embodiment, a non-limiting method for producing the laminate of the present invention is a method having a step of adhering the resin film on a substrate to mold the substrate, and a step of heating and curing the resin film on the substrate. In another non-limiting embodiment, the laminate is a polyimide metal clad laminate which includes a dielectric layer of polyimide and at least a conductive layer of metal foil, e.g., copper foil. The layers are bonded with or without adhesives.

A polyimide copper clad laminate can in one embodiment herein be a flexible copper clad laminate (FCCL).

There is also provided herein a process for manufacturing a laminate, preferably a copper clad laminate, more preferably a flexible copper clad laminate. Firstly, a resin (ii), e.g., a polyimide precursor of the present invention is provided. Then the silane coupling agent (i) and the resin (ii), and other optional components are mixed to prepare a resin composition, the resin composition solution is applied on a copper foil substrate. Then, the resin composition is cast onto a metal substrate and baked, in batch or continuously, at high temperature to cure the resin so as to obtain the copper clad laminate. Generally, the baking is at a temperature from about 200° C. to about 450° C. The copper foil is chosen so that the surface roughness of the foil has minimal impact on the clarity (minimal light scattering due to surface topography) of the resin (ii). Normally, the selected copper foil has a surface roughness of about 0.7 μm or less and such copper foil is referred to as "smooth copper foil."

In another embodiment, there is provided a process of manufacturing a flexible display comprising the resin composition described herein. In an embodiment, the method includes coating the resin composition onto a glass substrate; and, curing the resin composition to form a resin layer on the glass substrate. Examples of the electronic device according to embodiments of the present disclosure which may include the flexible display include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device.

EXAMPLES

Sample Preparation Process
　Polyimide precursor solution: 15 g polyimide precursor solid dissolved in 85 g of N-methyl-2-pyrrolidone (NMP)
　Silane solution: 0.075 g of silane dissolved in 5 g of N-methyl-2-pyrrolidone to make the silane solution. The control sample has no silane.
　Testing solution: The above silane solutions were added to the polyimide precursor solutions to prepare the testing solutions.
The formulations are illustrated in this table below:

Testing solution coating: Each substrate was coated with the 30 mil thick polyimide precursor solution.

Curing profile: The coated polyimide substrates were dried in convection oven at 110° C. for 1 hr; then in normal oven at 100° C. for 2 hrs; 200° C. for 1 hr; 250° C. for 1 hr; and finally, it was cooled down to RT.

Substrates: Copper, Stainless steel, and Glass were used as substrates for the following examples.

Adhesion characterization: Crosscut test was performed with standard Erichsen 430P tester to characterize adhesion, with the testing condition of: 40×40 mm grid with 2 mm spacing; under 5N weight; using hardened carbide tip.

Figure 1:
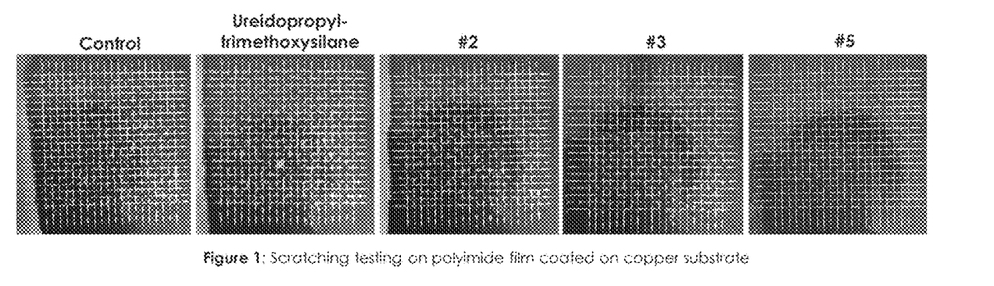
FIG. 1 is a photograph of a 20×20 scratch pattern of a polyimide resin film coated on a copper substrate.
Figure 2:
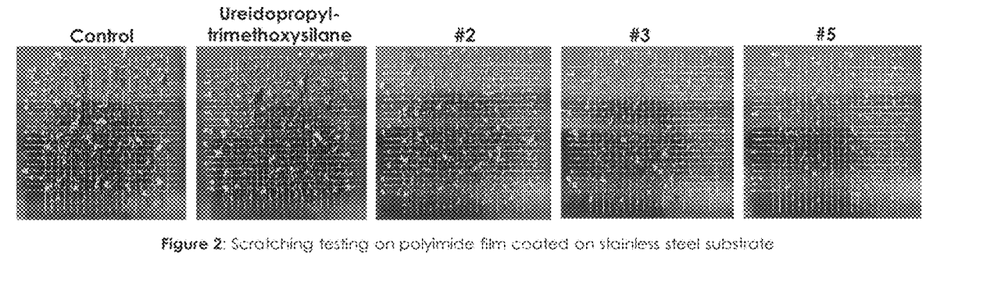
FIG. 2 is a photograph of a 20×20 scratch pattern of a polyimide resin film coated on a stainless steel substrate.
Figure 3:
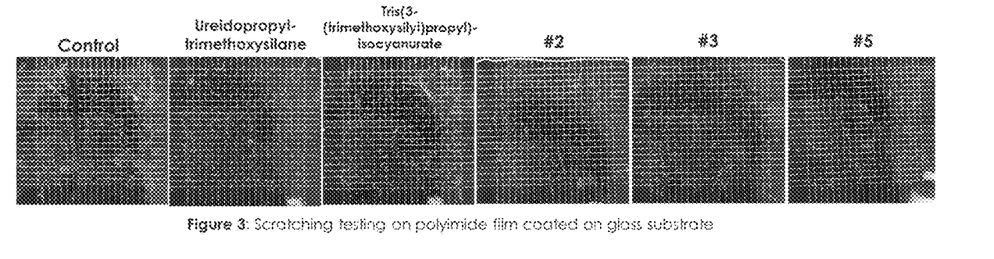
FIG. 3 is a photograph of a 20×20 scratch pattern of a polyimide resin film coated on a glass substrate.

Experimental Results:

A 20X20 scratch pattern was drawn on the polyimide resin coated copper (first row of photographs below), stainless-steel (second row of photographs below) and glass samples (third row of photographs below), respectively. Polyimide resin coating's anti-scratch performance is a direct indication of polyimide resin coating's adhesion to its substrates. As demonstrated in the figures, from left to right, as the silane coupling agent's hydrogen bonding power increases, interfacial bonding between the polyimide resin coating and its substrates increase, which resulted in less polyimide resin film scratched off.

Gamma-ureidopropyltrimethoxysilane is used as a comparison example in the current study. As shown herein, the above defined silanes #2, #3 and #5 clearly demonstrated much better anti-scratch properties compared to gamma-ureidopropyltrimethoxysilane and the control. Similarly, tris (3-(trimethoxysilyl)propyl)isocyanurate is another silane used in many applications to increase adhesion, however, silanes #2, #3 and #5 performed better as to adhesion properties than tris(3-(trimethoxysilyl)propyl)isocyanurate in an experiment where glass was used as a substrate.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

|  |  | Control | Ureidopropyl-trimethoxysilane | #2 | #3 | #5 |
|---|---|---|---|---|---|---|
| Silane solution | Silane | — | 0.075 g | 0.075 g | 0.075 g | 0.075 g |
|  | NMP | 5 g | 5 g | 5 g | 5 g | 5 g |
| Polyimide solution | Polyimide precursor | 15 g | 15 g | 15 g | 15 g | 15 g |
|  | NMP | 85 g | 85 g | 85 g | 85 g | 85 g |
| Total |  | 105 g | 105.075 g | 105.075 g | 105.075 g | 105.075 g |

The invention claimed is:
1. A resin composition comprising:
(i) a silane coupling agent of the general formula (I):

where X is a heterocyclic group containing 1 or 2 N atoms, and wherein $R^1$ and $R^2$ are each H, Y is O, Z is a divalent straight chain alkylene group containing from 2 to 6 carbon atoms, the subscript a is 3, and each $R^3$ is a straight chain alkyl group containing from 1 to 3 carbon atoms;
Y is oxygen or sulfur;
Z is a divalent straight chain alkylene group containing from 1 to 20 carbon atoms, or a divalent branched chain alkylene group containing from 3 to 20 carbon atoms, each optionally containing a heteroatom;
the subscript a is 1, 2 or 3;
$R^1$ and $R^2$ each represent a hydrogen atom or a monovalent organic group having 1 to 40 carbon atoms;
$R^3$ is independently a monovalent group selected from the group consisting of a straight chain alkyl containing from 1 to 12 carbon atoms, a branched chain alkyl containing from 3 to 12 carbon atoms, a cycloalkyl containing from 5 or 6 carbon atoms, an alkenyl containing from 2 to 12 carbon atoms, an aryl group containing 6 carbon atoms, or aralkyl containing from 7 to 12 carbon atoms, a straight chain alkyl containing 2 to 12 carbon atoms and a hydroxyl group, a branched chain alkyl containing 3 to 6 carbon atoms and a hydroxyl group, an alkyl group containing at least one oxygen atom having the structure:

and a divalent group formed from two $R^3$ groups being bonded together through a covalent bond,
with the provisos that (i) if two $R^3$ groups are bonded together, then a is 2 or 3 and (ii) the sum of m+n is from 1 to 20;
each $R^4$ is independently a monovalent group selected from the group consisting of a straight chain alkyl containing from 1 to 12 carbon atoms, a branched chain alkyl containing from 3 to 12 carbon atoms, a cycloalkyl containing from 5 or 6 carbon atoms, an alkenyl group containing from 2 to 12 carbon atoms, an aryl group containing 6 carbon atoms or aralkyl group containing from 7 to 12 carbon atoms;
$R^5$ is divalent group selected from the group consisting of a straight chain alkyl containing from 1 to 10 carbon atoms, a branched chain alkyl containing from 3 to 10 carbon atoms, and a cycloalkyl containing from 5 to 10 carbon atoms;
$R^6$ is a monovalent group selected from the group consisting of a straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, an aralkyl containing from 7 to 18 carbon atoms and hydrogen, or $R^6$ is a divalent group selected from the group consisting of an alkyl containing from 1 to 10 carbon atoms, a cycloalkyl containing from 5 to 10 carbon atoms and phenyl; and,
(ii) at least one resin which is interactive with one or more of the $R^1$, $R^2$, Y and X groups of silane coupling agent (i), and which is present in an amount of from about 10 weight percent to about 99.99 weight percent of the total weight of the resin composition.

2. The resin composition of claim 1, wherein X is a heterocyclic group containing 2 N atoms and which is substituted with an O heteroatom.

3. The resin composition of claim 1, wherein X is a heterocyclic group containing 2 N atoms and which is substituted with an O heteroatom and an alkyl group containing 1 or 2 carbon atoms.

4. The resin composition of claim 1, wherein the resin (ii) is selected from the group consisting of polyimide, polyetherimide, polyurethane, silylated polyurethane, polyether, silylated polyether, polyphenylene ether, bismaleimide, polyisocyanurate, polyethylene terephthalate, glycol-modified polyethylene terephthalate, polybutylene terephthalate, low density polyethylene, very low density polyethylene, linear low density polyethylene, high density polyethylene, polypropylene, polyisobutylene, polyvinyl acetate, polyvinyl alcohol, polystyrene, polycarbonate, polyethylene napthalate, polyvinylchloride, polyvinylidene chloride, polyvinylidene fluoride, acrylonitrile butadiene styrene, polymethylmethacrylate, polyvinyl fluoride, polyamides, polymethylpentene, polyether ether ketone, polysulfone, polyether sulfone, ethylene chlorotrifluoroethylene, polytetrafluoroethylene, cellulose acetate, cellulose acetate butyrate, plasticized polyvinyl chloride, polyphenylene sulfide, styrene-maleic anhydride, modified polyphenylene oxide, ethylene-propylene rubber, polybutadiene, polychloroprene, polyisoprene, styrene-butadiene-styrene, styrene-ethylene-butadiene-styrene, and mixtures thereof.

5. The resin composition of claim 1, wherein the resin (ii) is selected from the group consisting of polyimide, polyetherimide, polyurethane, polyphenylene ether, bismaleimide, polyisocyanurate, polyethylene terephthalate, polyethylene, polypropylene, polyisobutylene and combinations thereof.

6. The resin composition of claim 1, wherein the resin (ii) is polyimide.

7. The resin composition of claim 1, wherein X is a heterocyclic group containing 2 N atoms and which is substituted with an O heteroatom and an alkyl group containing 1 or 2 carbon atoms, and, wherein the resin (ii) is selected from the group consisting of polyimide, polyetherimide, polyurethane, polyphenylene ether, bismaleimide, polyethylene terephthalate, polyethylene, polypropylene, polyisobutylene and combinations thereof.

8. The resin composition of claim 7, wherein the resin (ii) is polyimide.

9. A process of making the resin composition of claim 1 comprising contacting the silane coupling agent (i) and resin (ii).

10. An article made from the resin composition of claim 1, wherein the article is selected from the group consisting of a resin film, a resin film with copper foil, a laminate prepreg, a printed circuit board, and a flexible electronic device.

11. The article of claim 10, wherein article is a laminate prepreg comprising a substrate selected from the group consisting of plastic film, silicon wafer, ceramic, organic material, metal and glass.

12. The article of claim 11 wherein the substrate is a copper foil.

13. The article of claim 11, which is a flexible copper clad laminate.

14. The article of claim 10, which is a flexible electronic display device.

15. A foldable smartphone or a rollable smartphone comprising the flexible electronic display device of claim 14.

16. A process for manufacturing a copper clad laminate comprising the steps of:
   (a) coating the resin composition of claim 1 onto a copper foil; and,
   (b) heating the coated copper foil to obtain the copper clad laminate.

17. A process for manufacturing a flexible display comprising the steps of:
   (a) coating the resin composition of claim 1 onto a glass substrate; and,
   (b) curing the resin composition to form a resin layer on the glass substrate.

\* \* \* \* \*